US010389159B2

(12) United States Patent
Lahti et al.

(10) Patent No.: US 10,389,159 B2
(45) Date of Patent: Aug. 20, 2019

(54) WIRELESS CHARGING SYSTEM AND METHOD

(71) Applicant: Intel Corporation, Santa Clara, CA (US)

(72) Inventors: Saku Lahti, Es (FI); Mikko S. Komulainen, Es (FI); Erkki Nokkonen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 335 days.

(21) Appl. No.: 15/283,344

(22) Filed: Oct. 1, 2016

(65) Prior Publication Data

US 2018/0097394 A1 Apr. 5, 2018

(51) Int. Cl.
*H02J 50/12* (2016.01)
*H02J 7/02* (2016.01)

(52) U.S. Cl.
CPC .............. *H02J 7/025* (2013.01); *H02J 50/12* (2016.02)

(58) Field of Classification Search
CPC ................................. H02J 50/10; H02J 50/12
See application file for complete search history.

(56) References Cited

U.S. PATENT DOCUMENTS

| | | | | |
|---|---|---|---|---|
| 2012/0267960 A1* | 10/2012 | Low | H02J 50/12 | 307/104 |
| 2013/0020878 A1* | 1/2013 | Karalis | H02J 50/12 | 307/104 |
| 2015/0130294 A1* | 5/2015 | Suzuki | H02J 50/12 | 307/104 |
| 2016/0056640 A1* | 2/2016 | Mao | H02J 50/12 | 307/104 |
| 2017/0085131 A1* | 3/2017 | Liu | H02J 50/12 | |

FOREIGN PATENT DOCUMENTS

WO WO 2014125392 A1 * 8/2014 ............. H02J 50/12

* cited by examiner

*Primary Examiner* — Fritz M Fleming
(74) *Attorney, Agent, or Firm* — Schiff Hardin LLP

(57) ABSTRACT

A wireless charging system and a method for tuning the wireless charging system is described. The system can include matching circuitry coupled to a transmission coil and a controller coupled to the matching circuitry. The transmission coil can have a load inductance. The controller can control the matching circuitry to adjust a voltage associated with the capacitance value based on the load inductance to cause the voltage associated with the capacitance value and a current associated with the capacitance value to be in phase.

25 Claims, 12 Drawing Sheets

300

400

WIRELESS CHARGING SYSTEM AND METHOD

BACKGROUND

Field

Aspects described herein generally relate to wireless charging devices, including power transmission systems tunable for variable loads.

Related Art

Wireless charging or inductive charging uses a magnetic field to transfer energy between two devices. Wireless charging of a device can be implemented using charging station. Energy is sent from one device to another device through an inductive coupling. The inductive coupling is used to charge batteries or run the receiving device. In operation, power is delivered through non-radiative, near field, magnetic resonance from a Power Transmitting Unit (PTU) to a Power Receiving Unit (PRU).

PTUs use an induction coil to generate a magnetic field from within a charging base station, and a second induction coil in the PRU (e.g., in a portable device) takes power from the magnetic field and converts the power back into electrical current to charge the battery and/or power the device. In this manner, the two proximal induction coils form an electrical transformer. Greater distances between Transmitter and receiver coils can be achieved when the inductive charging system uses magnetic resonance coupling. Magnetic resonance coupling is the near field wireless transmission of electrical energy between two coils that are tuned to resonate at the same frequency.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, a receiving coil of a PRU is coupled to the transmitting coil of the PTU via the mutual inductance M between the transmitting and receiving coils. In operation, different PRUs can different receiving coil inductances (e.g., Lrx in FIG. 1) and/or different matching circuitry. Further, the mutual inductance between the transmitting and receiving coils will vary based on the location and proximity of the PRU with respect to the PTU. Consequently, the impedance present to the transmitter (e.g., Z' in FIG. 1) can vary widely.

Figure 1:
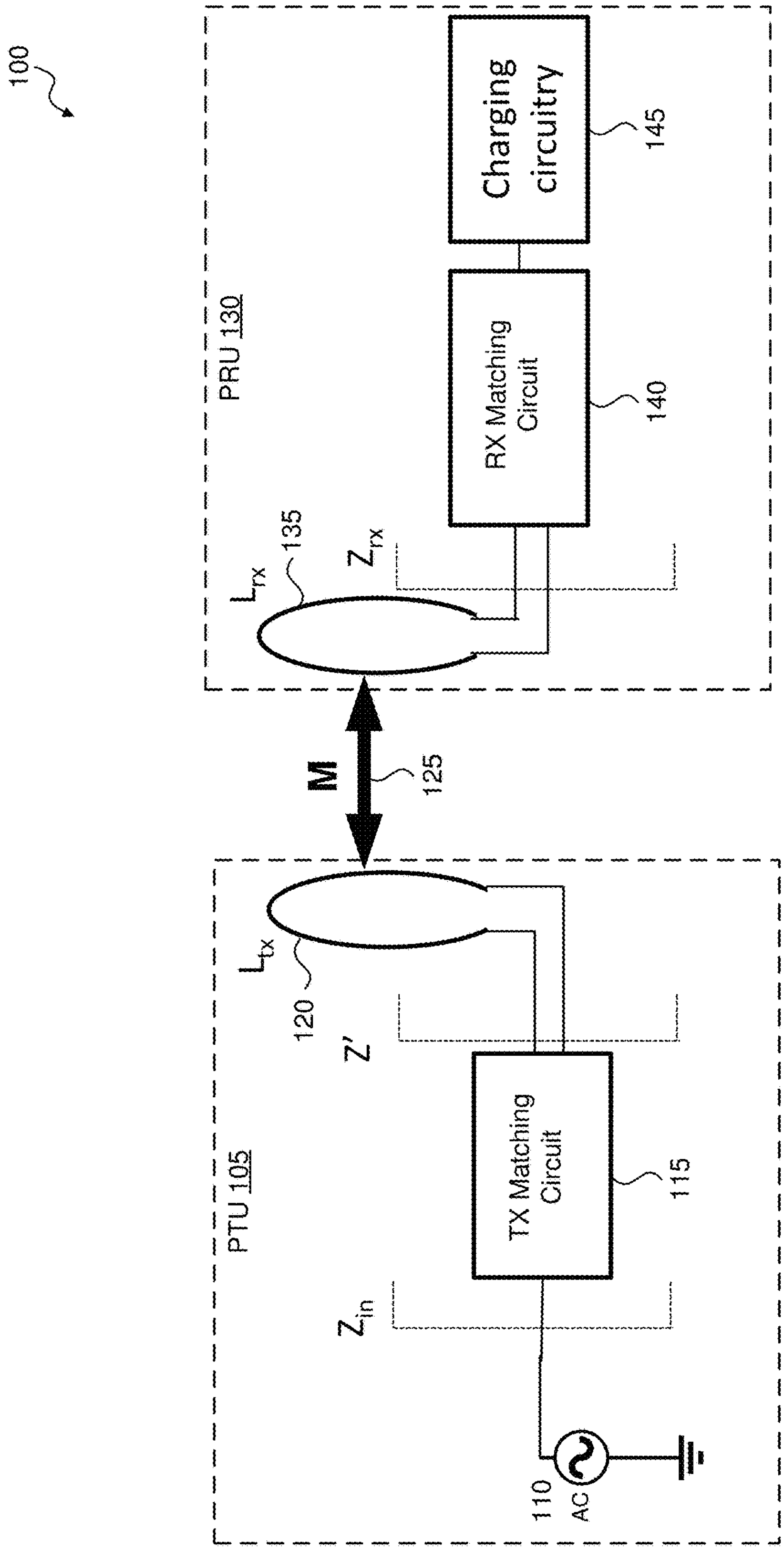
FIG. 1 illustrates a wireless charging system according to an exemplary aspect of the present disclosure.

FIG. 1 illustrates a wireless charging system 100 with a power transmit unit (PTU) 105 configured to charge a power receiving unit (PRU) 130. The PTU 105 includes a power source, such as AC power supply 110 that supplies power to transmission (TX) matching circuit 115. The TX matching circuit 115 is configured to drive transmission coil 120 to generate a magnetic field. The transmission coil 120 can have a transmission coil inductance $L_{TX}$ that couples to a receiving coil 135 of the PRU 130 having a receiving coil inductance $L_{RX}$ via the mutual inductance M 125 of the coils 120 and 135.

In an exemplary aspect, the PTU 105 is configured to perform one or more wireless charging operations conforming to one or more wireless power protocols/standards such as one or more AirFuel Alliance (AA) standards, Alliance for Wireless Power (A4WP) standards, Powers Matters Alliance (PMA) standards, Wireless Power Consortium standards (e.g., Qi), or other wireless power standards/protocols as would be understood by one of ordinary skill in the relevant arts. In operation, the PTU 105 can be configured to deliver power (e.g., through non-radiative, near field, magnetic resonance) to the PRU 108.

The TX matching circuit 115 is configured to generate a tunable capacitance to tune the wireless charging system 100 into resonance. In operation, the TX matching circuit 115 is configured to provide a resistive load at point $Z_{in}$. In an exemplary aspect, the TX matching circuit 115 is configured to adjust a voltage across a capacitor to tune the system 100 into resonance. In this example, the TX matching circuit 115 is configured to match one or more impedances of one or more components of the system 100 with the impedances of the coils 120 and/or 135.

In an exemplary aspect, the TX matching circuit 115 includes one or more capacitors, resistors, and/or inductors.

For example, the TX matching circuit 115 can include a capacitor. The capacitor can include a capacitor bank formed of a plurality of capacitors in series and/or parallel that can be selectively activated/deactivated (e.g., by corresponding switches). In an exemplary aspect, the TX matching circuit 115 includes a plurality of capacitors having a series capacitance that can be changed to tune a varying load (e.g., load 210 in FIG. 2) into resonance (i.e., to provide a resistive load at point $Z_{in}$ to the power supply 110 at a desired frequency. In operation, the capacitors can be switched in or out of the circuitry using one or more switches such as RF-switches.

The PRU 130 includes the receiving coil 135 having a receiving coil inductance $L_{RX}$. The receiving coil 135 can be configured to convert the magnetic field generated by the transmission coil 120 into an electrical current and to supply the electrical current to the receiving (RX) matching circuit 140. The RX matching circuit can be configured to generate a tunable capacitance to tune the wireless charging system 100 into resonance.

Figure 2:
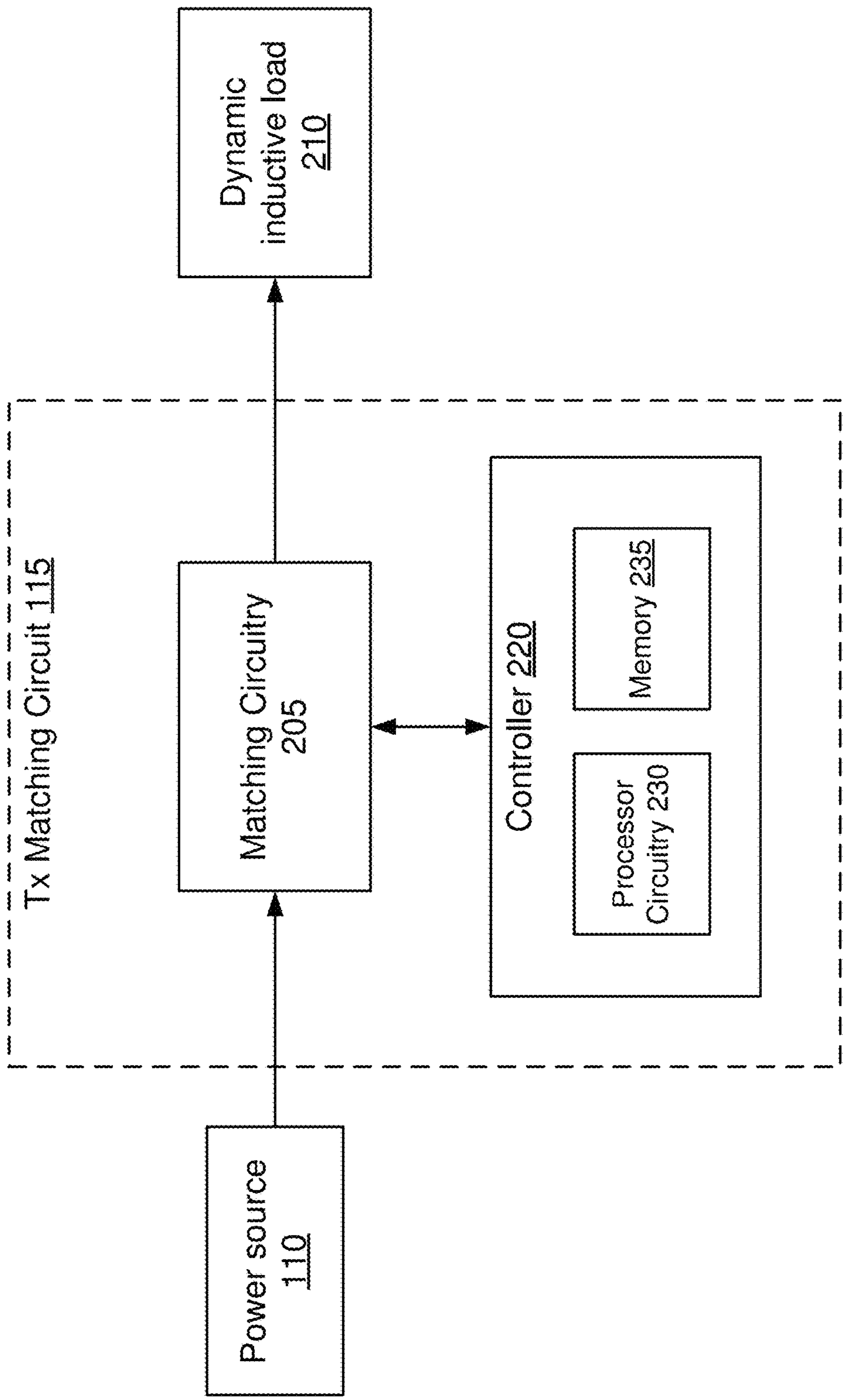
FIG. 2 illustrates a matching circuit according to an exemplary aspect of the present disclosure.

FIG. 2 illustrates an exemplary aspect of the TX matching circuit 115. The TX matching circuit 115 can include a matching circuitry 205 and controller 220 coupled to the matching circuitry 205.

The matching circuitry 205 can be configured to drive a transmission coil (e.g., coil 120), which may have a varying inductive load and is represented by dynamic inductive load 210, based on the power provided by the power source 110. In an exemplary aspect, the matching circuitry 205 is configured to generate a tunable capacitance to tune the wireless charging system 100 into resonance. In an exemplary aspect, the matching circuitry 205 is configured to generate a tunable capacitance based on one or more control signals from the controller 220. In an exemplary aspect, the matching circuitry 205 is configured to adjust a voltage across a capacitor to tune the system 100 into resonance. In this example, the matching circuitry 205 is configured to match one or more impedances of one or more components of the system 100.

In an exemplary aspect, the matching circuitry 205 includes one or more capacitors, resistors, and/or inductors. For example, the matching circuitry 205 can include a capacitor. The capacitor can include a capacitor bank formed of a plurality of capacitors in series and/or parallel that can be selectively activated/deactivated (e.g., by corresponding switches). In an exemplary aspect, the matching circuitry 205 includes a plurality of capacitors having a series capacitance that can be changed to tune a varying load (e.g., load 210) into resonance (i.e., to provide a resistive load at point $Z_{in}$ to the power supply 110 at a desired frequency. In operation, the capacitors can be switched in or out of the circuitry using one or more switches such as RF-switches. An exemplary aspect of the matching circuitry 205 is described with reference to FIG. 3 below.

The controller 220 can include processor circuitry 230 and a memory 205. The processor circuitry 230 can be configured to generate one or more control signals to control the tuning by the matching circuitry 205. In an exemplary aspect, the processor circuitry 230 can be configured to receive one or more measurements from the matching circuitry 205, such as the input voltage supplied by the power source 110, a voltage over a capacitor ($V_{cap}$) of the matching circuitry 205, the impedance (e.g., inductiveness) of the load 210, and/or other information or parameters as would be understood by one of ordinary skill in the art. In an exemplary aspect, the controller 220 can be configured to adjust the voltage over a capacitor ($V_{cap}$) based on one or more measurements from the matching circuitry 205, such as the input voltage supplied by the power source 110, the voltage over a capacitor ($V_{cap}$) of the matching circuitry 205, the impedance of the load 210 and/or impedance of one or more components of the system 100, such as coils 120 and/or 135. In an exemplary aspect, the controller 220 can be configured adjust the duty cycle of the switch 310 to adjust the voltage $V_{cap}$ across the capacitor (e.g., capacitor 305 in FIG. 3). In this example, the controller 220 is configured to match the impedance of the dynamic inductive load 210 (e.g. coil 120) to an impedance of one or more components of the system 100.

The memory 235 can store data and/or instructions, where when the instructions are executed by the processor circuitry 230, controls the processor circuitry 230 to perform the functions described herein. The memory 235 can additionally or alternatively store measurements received from the matching circuitry 205.

The memory 205 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 205 can be non-removable, removable, or a combination of both.

Figure 3:
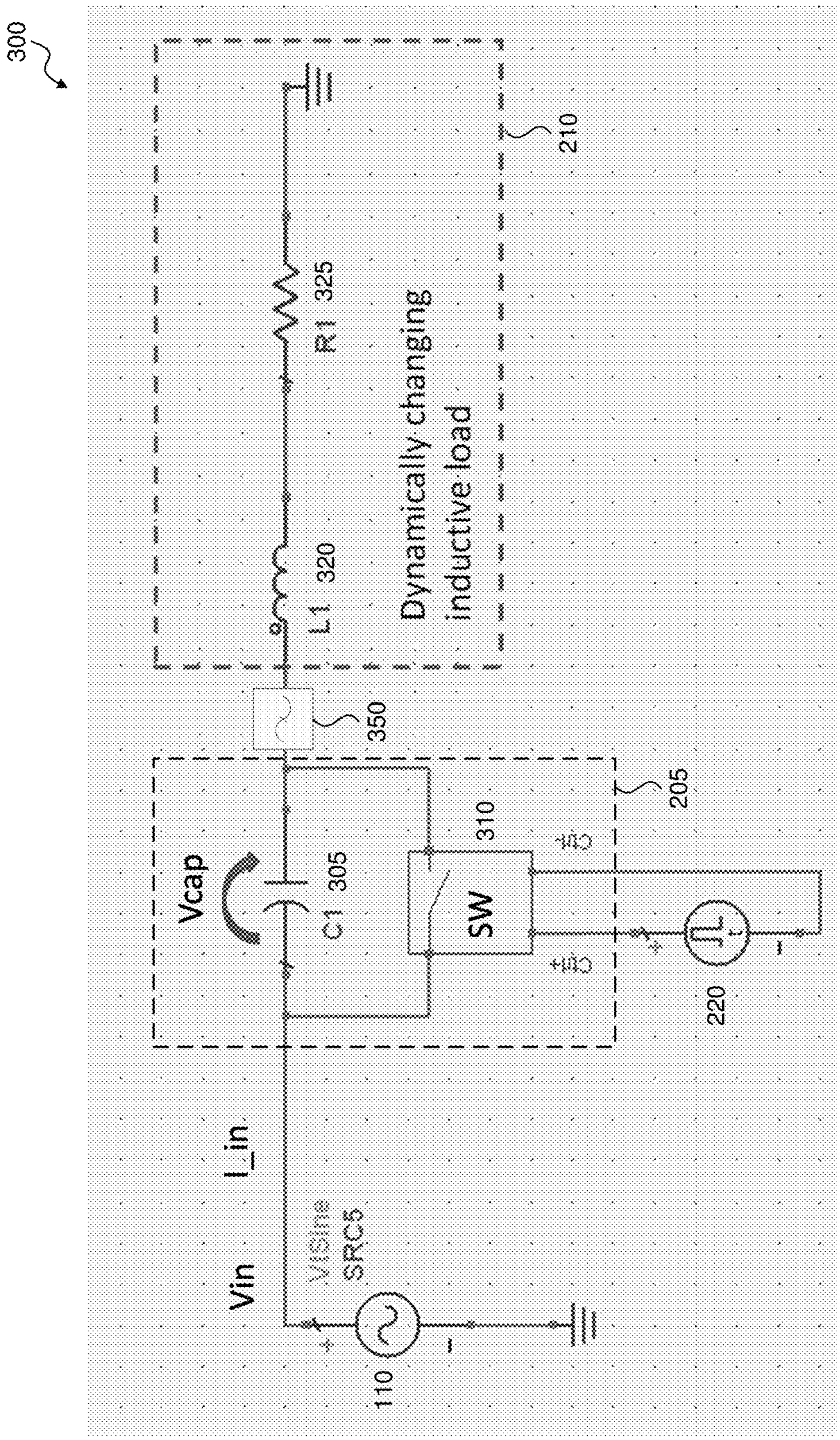
FIG. 3 illustrates a wireless charging system according to an exemplary aspect of the present disclosure.

FIG. 3 illustrates a wireless charging system 300 according to an exemplary aspect of the present disclosure.

Similar to FIG. 2, the system 300 includes power source 110, matching circuitry 205, controller 220 coupled to the matching circuitry 205, and load 210. As illustrated in FIG. 3, the matching circuitry 205 can include a capacitor 305, and a switch 310 coupled in parallel to the capacitor 305. In an exemplary aspect, the capacitor 305 is a fixed capacitor. The capacitor 305 can be referred to as matching capacitor 305.

In an exemplary aspect, the system 300 can include a filter 350 connected between the matching circuitry 205 and the load 210. For example, the filter 350 can be connected between the output of the capacitor and the load 210. The filter 350 can be a low-pass filter but is not limited thereto. The load can include resistive and inductive components represented by inductor 320 and resistor 325.

The matching circuitry 205 can be configured to drive a transmission coil (e.g., coil 120), which may have a varying inductive load and is represented by dynamic inductive load 210, based on the power provided by the power source 110. In an exemplary aspect, the matching circuitry 205 is configured to adjust the capacitance of the capacitor 305 to tune the wireless charging systems 100, 300 into resonance. In an exemplary aspect, the matching circuitry 205 is configured to adjust the capacitance based on one or more control signals from the controller 220. In an exemplary aspect, the matching circuitry 205 is configured to adjust the duty cycle of the switch 310 to adjust the voltage $V_{cap}$ across the capacitor 305. In this example, the matching circuitry 205 is configured to match the impedance of the dynamic inductive load 210 (e.g. coil 120) to an impedance of one or more components of the system 300, such as the PTU 105 and/or the PRU 130.

In an exemplary aspect, the power source 110 is connected to a first side of the capacitor 305 and the second side of the capacitor 305 is connected to the load 210. In exemplary aspects that include the filter 350, the filter 350 can be connected between the second side of the capacitor 305 and the load 210.

In an exemplary aspect, the switch 310 is connected in parallel with the capacitor 305. For example, the first side of the switch 310 can be connected to the first side of the capacitor 305 (e.g., at the node formed between the capacitor 305 and the power source 110). The second side of the switch can be connected to the second side of the capacitor 305 (e.g., at the node formed between the capacitor 305 and the load 210). In operation, when the switch 310 is closed (active), the switch 310 creates a short parallel to the capacitor 305. When open, the path via the switch 310 parallel to the capacitor 305 becomes an open path.

In an exemplary aspect, the controller 220 is configured to control the activation of the switch 310. For example, the controller 220 can be configured to control the switch 310 to activate (close) and deactivate (open) based on one or more control signals (ctrl+, ctrl−). In an exemplary aspect, the controller 220 can be configured to activate and deactivate the switch 310 (e.g., adjust the duty cycle of the switch 310) to control the voltage across the capacitor $V_{cap}$.

In an exemplary aspect, the controller 220 can be configured to drive the switch 310 at 90° phase difference from the phase of the input voltage of the power source 110. In this example, at a resonant frequency, the input voltage $V_{in}$ and the input current $I_{in}$ are in phase. In operation, the current through the capacitor will be 90° out of phase with respect to the voltage across the capacitor $V_{cap}$, with the current leading the voltage by 90°. Based on this relationship, at resonant frequency, the input voltage $V_{in}$ and the voltage across the capacitor $V_{cap}$ are at 90° phase shift, with the $V_{cap}$ lagging behind the input voltage $V_{in}$.

Figure 4:
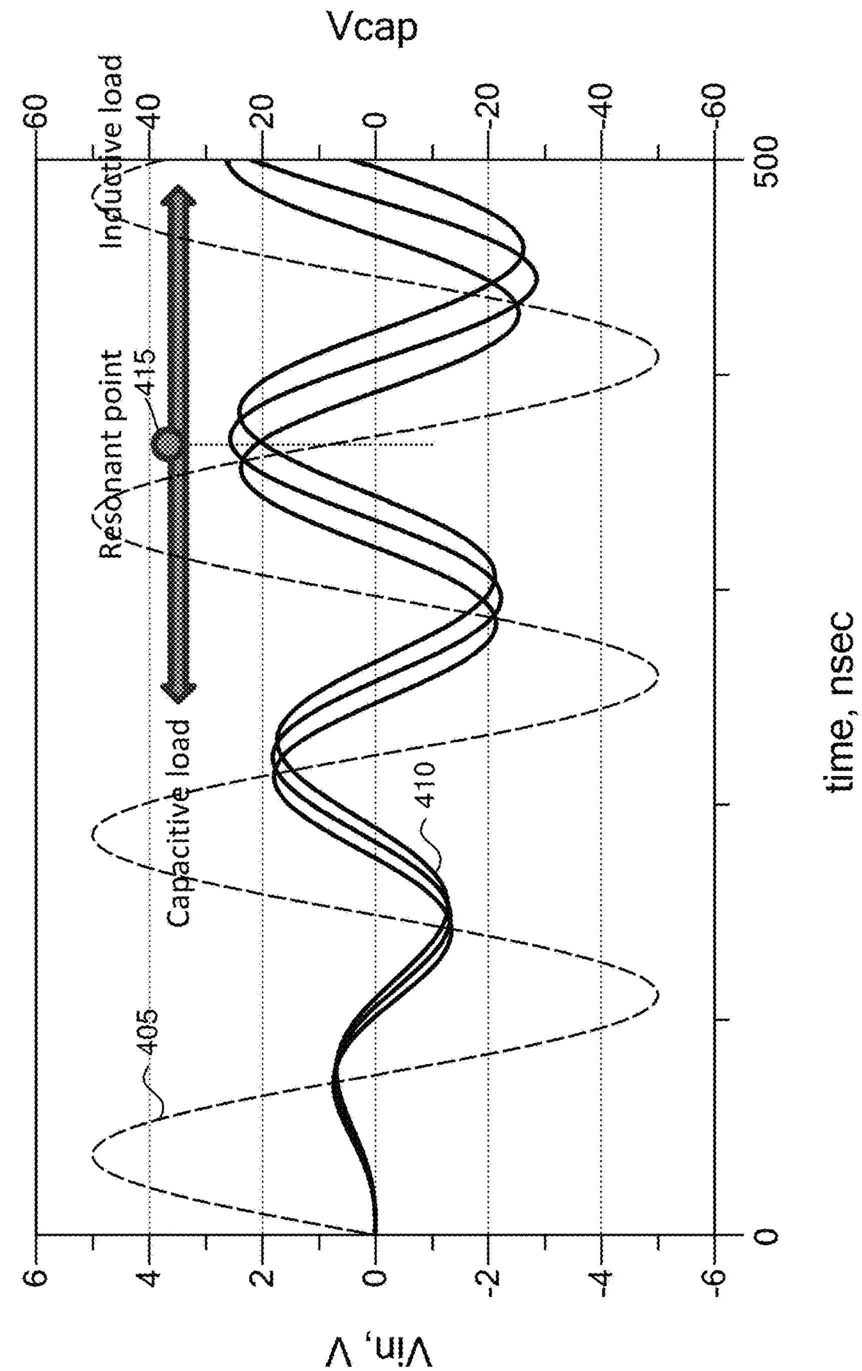
FIG. 4 illustrates a capacitor voltage and load relationship according to an exemplary aspect of the present disclosure.

The relationship of the phase of the voltage across the capacitor $V_{cap}$ (410) with respect to the load is illustrated in FIG. 4. When the load changes to be more capacitive (i.e., the load inductance is reduced) from the resonant point 415, the phase difference between the voltage across the capacitor $V_{cap}$ 410 and the input voltage $V_{in}$ 405 changes such that the voltage across the capacitor $V_{cap}$ begins to catch (i.e., lag less) the input voltage $V_{in}$.

In an exemplary aspect, the switch 310 is activated when the input voltage $V_{in}$ reaches its maximum. By activating and deactivating the switch 310, the controller 220 is configured to force the current and the voltage across the capacitor $V_{cap}$ to be in phase. That is, the controlled activation of the switch 310 controls the voltage across the capacitor $V_{cap}$ to maintain the 90° phase shift with respect to the input voltage $V_{in}$.

In an exemplary aspect, the controller 220 is configured to adjust the duty cycle of the switch 310 based on the inductance of the load 210. For example, the controller 220 can be configured to adjust the duty cycle of the switch 310 based on the inductance of the load 210 such that the voltage across the capacitor $V_{cap}$ returns to zero or substantially zero at the same or approximately the same time the switch 310 is activated by the controller 220. In this example, the voltage across the capacitor $V_{cap}$ returns to zero or substantially zero when the input voltage $V_{in}$ reaches its maximum. In an exemplary aspect, the controller 220 is configured to adjust the duty cycle of the switch 310 to adjust the voltage $V_{cap}$ across the capacitor 305. In this example, the matching circuitry 205 is configured to match the impedance of the dynamic inductive load 210 (e.g. coil 120) to an impedance of one or more components of the system 300, such as the PTU 105 and/or the PRU 130.

Figure 5:
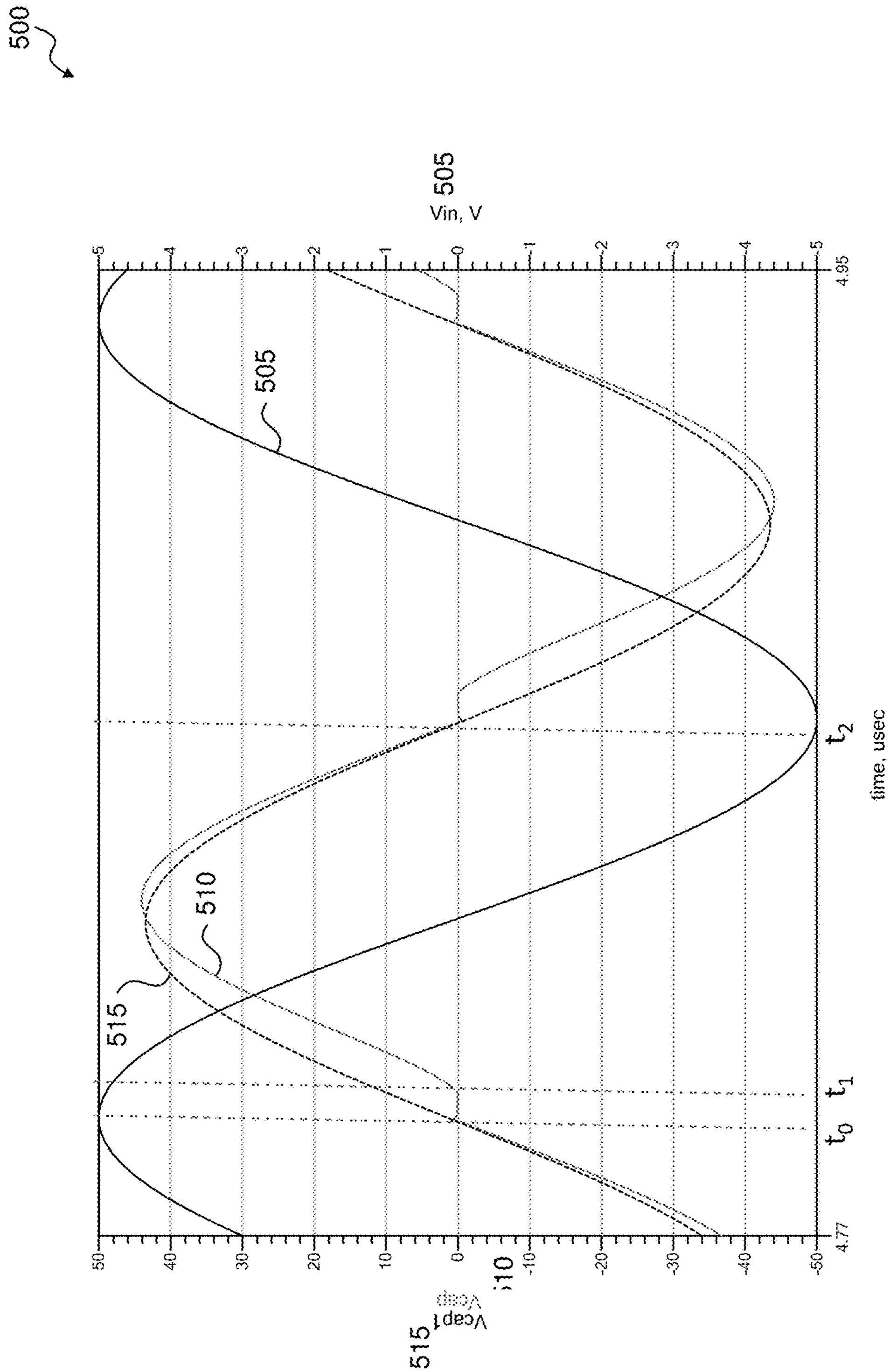
FIGS. 5 and 6 illustrate a capacitor voltage and input voltage relationship according to an exemplary aspect of the present disclosure.
Figure 6:
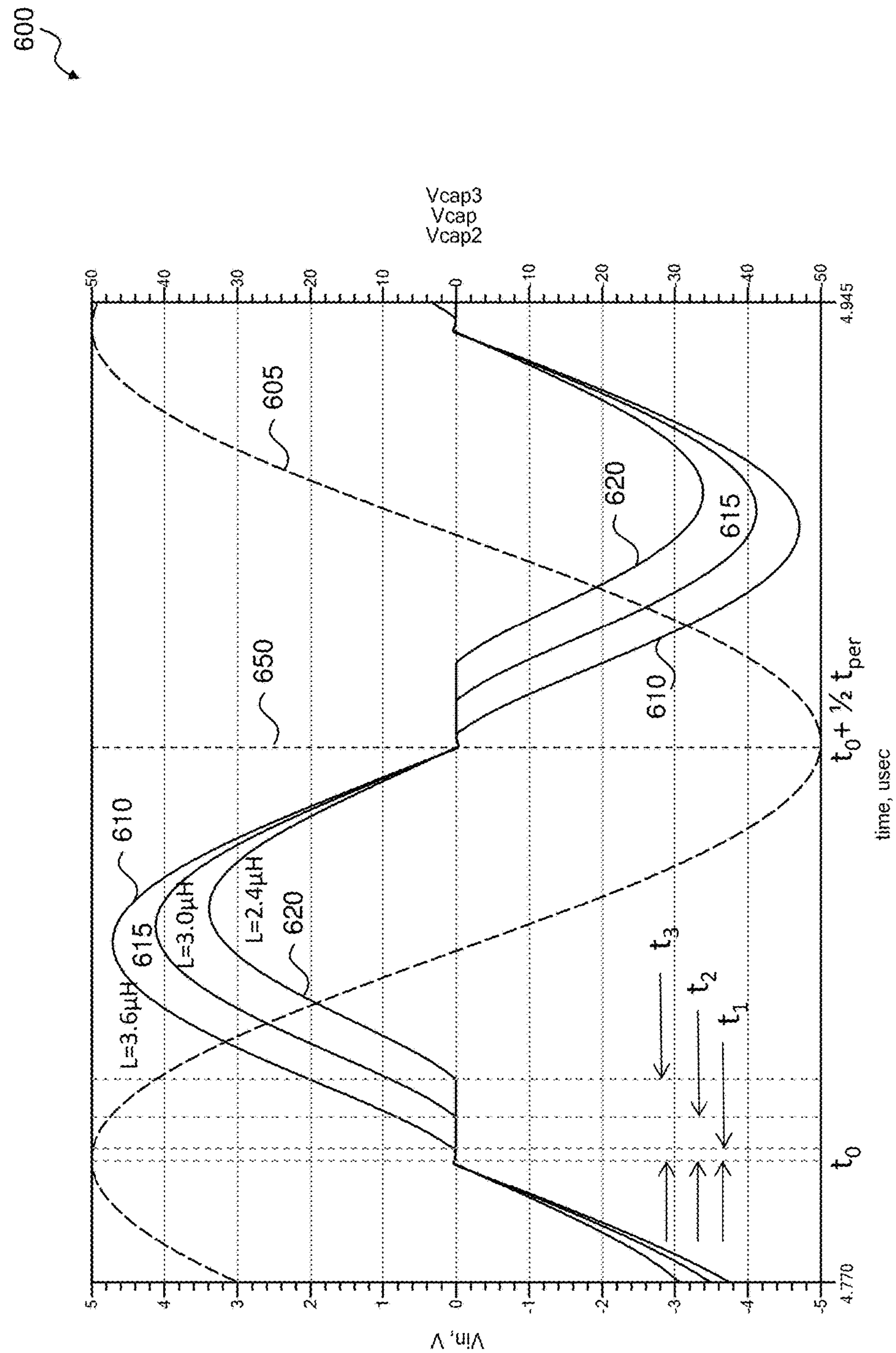

This relationship is illustrated in FIGS. 5 and 6. For example, the input voltage $V_{in}$ 505 is illustrated with respect to two capacitor voltages: $V_{cap}$ 510 and $V_{cap1}$ 515. The $V_{cap1}$ 515 represents a reference voltage of the voltage over a fixed capacitor without switching. In this example, the controller 220 activates the switch 310 to close at to and deactivate (open) at $t_1$. The controller 220 is configured to determine the switch activation period (e.g., $t_1-t_0$) when the switch 310 is closed (on) based on the input voltage $V_{in}$ and the voltage across the capacitor $V_{cap}$. In an exemplary aspect, the controller 220 is configured to determine the switch activation period (e.g., $t_1-t_0$) such that the $V_{cap}$ returns to zero or substantially zero at $t_2$ when the input voltage $V_{in}$ reaches its maximum. The switch activation period (e.g., $t_1-t_0$) can also be referred to as the duty cycle of the switch 310.

With reference to FIG. 6, the relationship between the voltage across the capacitor $V_{cap}$ 610, 615, 620 and the input voltage $V_{in}$ 605 is illustrated for various load inductances (e.g., L=3.6 μH, 3.0 μH, 2.4 μH). In this example, the duty cycles of the switch 310 with respect to the different load inductances is shown as $t_1-t_0$, $t_2-t_0$, and $t_3-t_0$ for the inductances L=3.6 μH, 3.0 μH, 2.4 μH, respectively. In an exemplary aspect, the controller 220 is configured to control the duty cycle of the switch 310 to control the phase shift between the voltage across the capacitor $V_{cap}$ and the input voltage $V_{in}$ based on the load inductance such that the voltage across the capacitor $V_{cap}$ 605 returns to zero or substantially zero when the input voltage $V_{in}$ reaches its maximum at time 650 ($t_0$+T/2).

Figure 7:
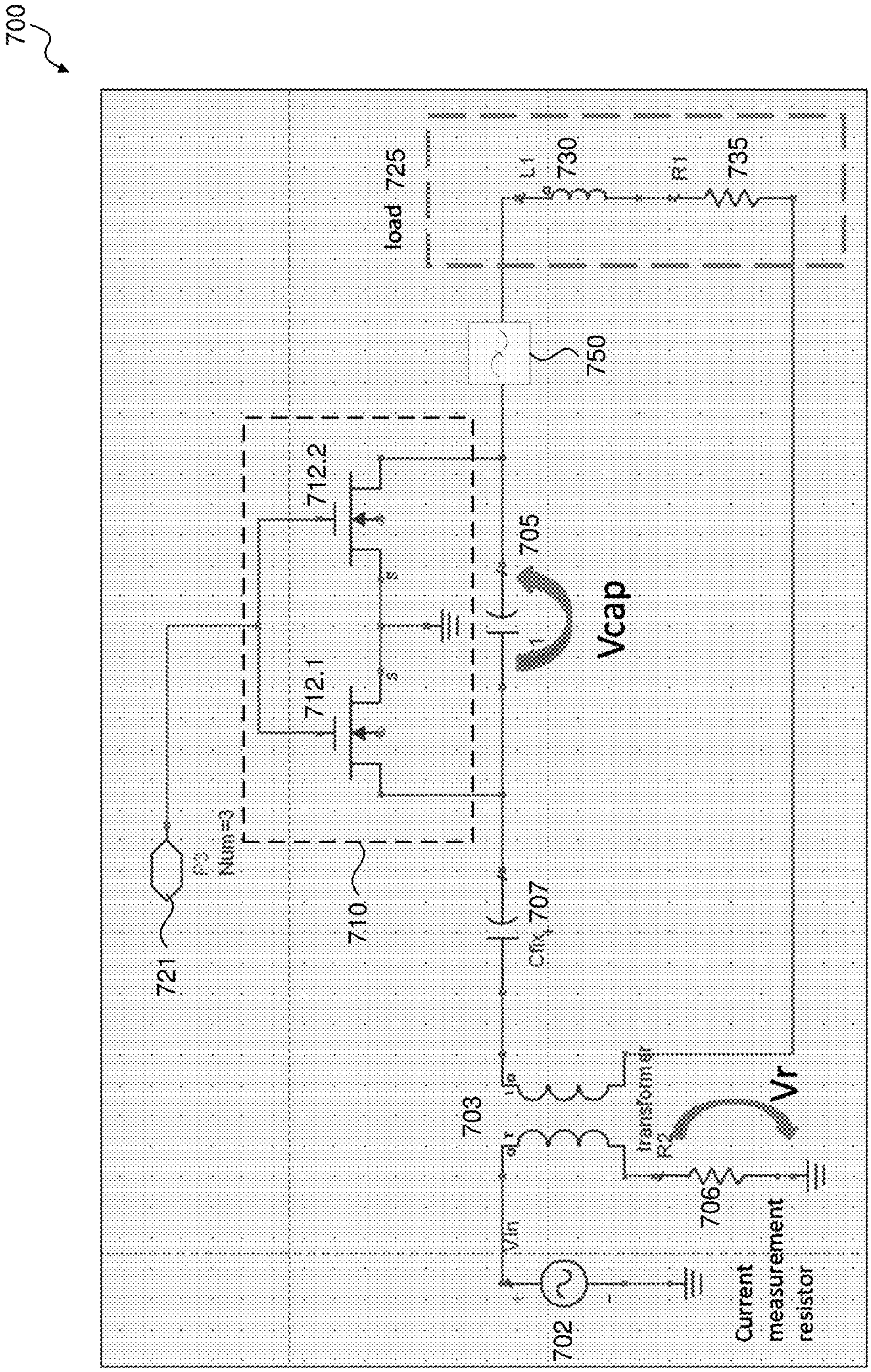
FIG. 7 illustrates a wireless charging system according to an exemplary aspect of the present disclosure.

FIG. 7 illustrates a wireless charging system 700 according to an exemplary aspect of the present disclosure. The system 700 is similar to the system 300 and discussion of common or similar elements may have been omitted for brevity. Similar to the system 300, the system 700 includes a capacitor 705 that is activated based on a control signal 721 (from controller 220). The control signal 721 activates one or more switches 712. The switches can be MOSFETs but are not limited thereto. The system 700 can also include a filter 750 similar to filter 350. The load 725 can similarly include inductive and resistive components represented as inductor 730 and resistor 735.

In an exemplary aspect, the system 700 includes a transformer 703 that isolates the power source 702 from the capacitor 705 and load circuitry (e.g., controller 220 that provides control signal 721). The power side of the transformer 703 can be connected to the power source 702 and to ground via resistor 706. The load side of the transformer 703 can be connected to the capacitor 705 and across the load 725. In an exemplary aspect, the transformer 703 can be connected to the capacitor 705 via one or more capacitors 707. The capacitor(s) 707 can be a fixed capacitor, but are not limited thereto.

In an exemplary aspect, the transformer 703 limits the voltage over the switch 710, thereby allowing for a reduced operating voltage of the switching circuitry. In this example, the low-level logic signals (e.g., control signal 721) can be used to control the switch 710.

Figure 8:
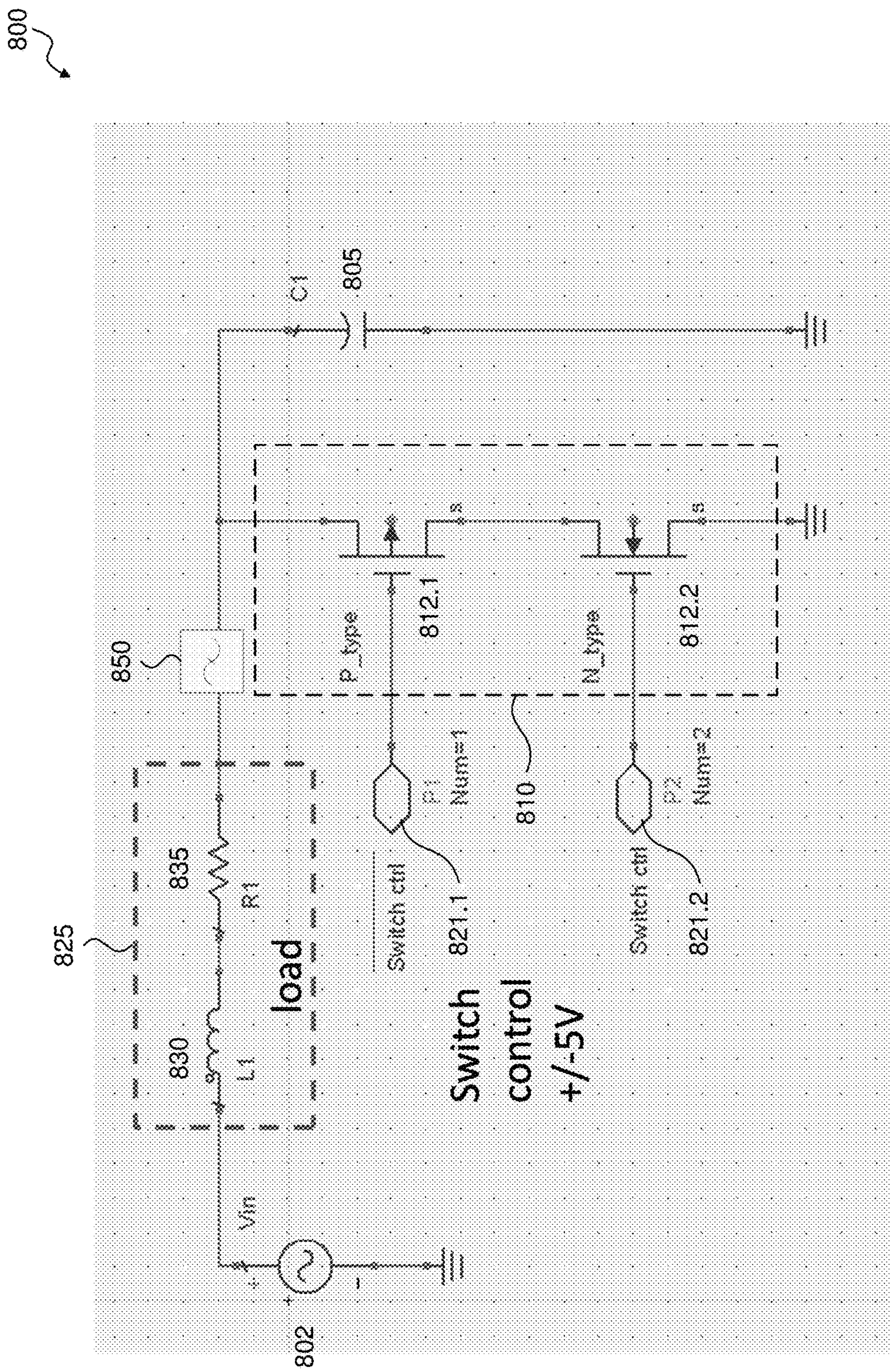
FIG. 8 illustrates a wireless charging system according to an exemplary aspect of the present disclosure.

FIG. 8 illustrates a wireless charging system 800 according to an exemplary aspect of the present disclosure. The system 800 is similar to the systems 300 and 700, and discussion of common or similar elements may have been omitted for brevity.

Similar to the systems 300 and 700, the system 800 includes a capacitor 805 that is activated based on a control signal 821 (from controller 220). The control signal 821 activates one or more switches 812. The switches can be MOSFETs but are not limited thereto. The system 800 can also include a filter 850 similar to filter 350 and/or 850. The load 825 can similarly include inductive and resistive components represented as inductor 830 and resistor 835.

In system 800, the capacitor 805 is connected after the inductive load 825 instead of before the load as in systems 300, 700.

Figure 9:
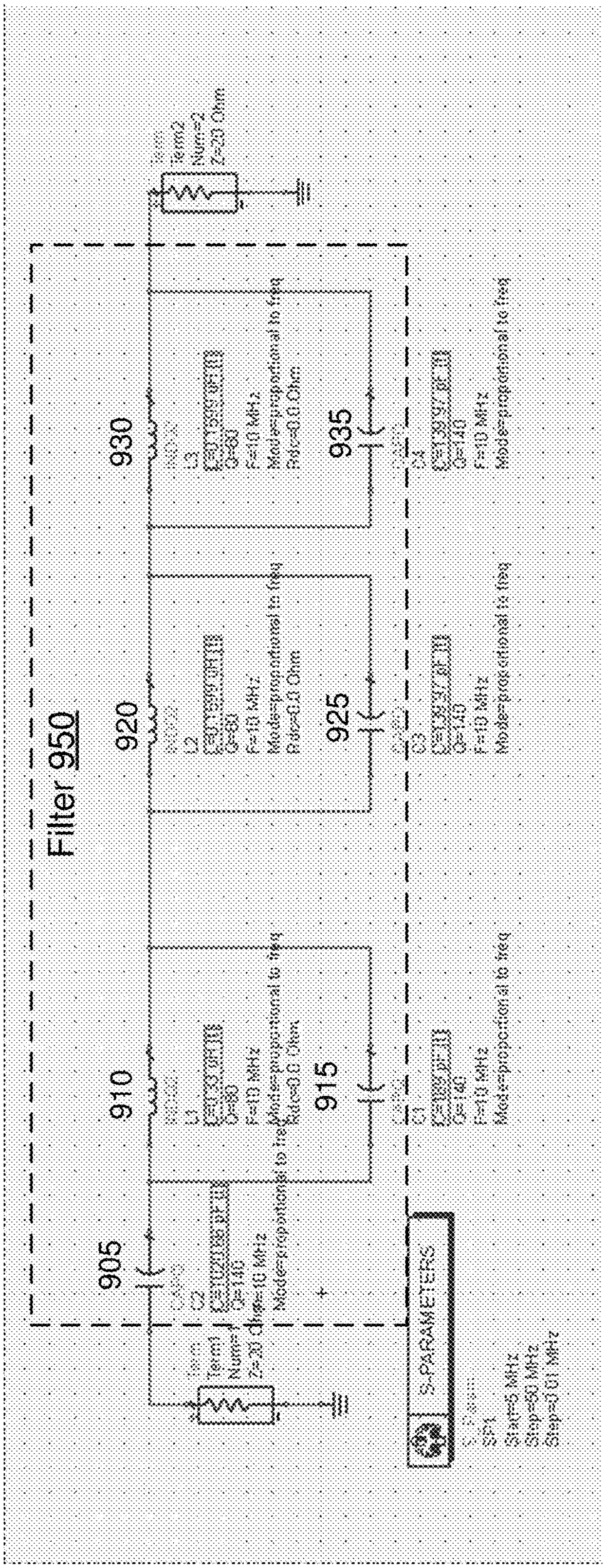
FIG. 9 illustrates a filter according to an exemplary aspect of the present disclosure.

FIG. 9 illustrates a filter 950 according to an exemplary aspect of the present disclosure. The filter 950 can be an exemplary aspect of the filter 350, 750 and/or 850.

In an exemplary aspect, the filter 950 includes one or more inductors and capacitors. For example, the filter 950 can include a capacitor 905 in series with one or more LC pairs (e.g., notch filters), where an LC pair includes an inductor in parallel with capacitor. The capacitor 905 can be configured to tune the system 300, 700, 800 at the fundamental frequency.

Figure 10:
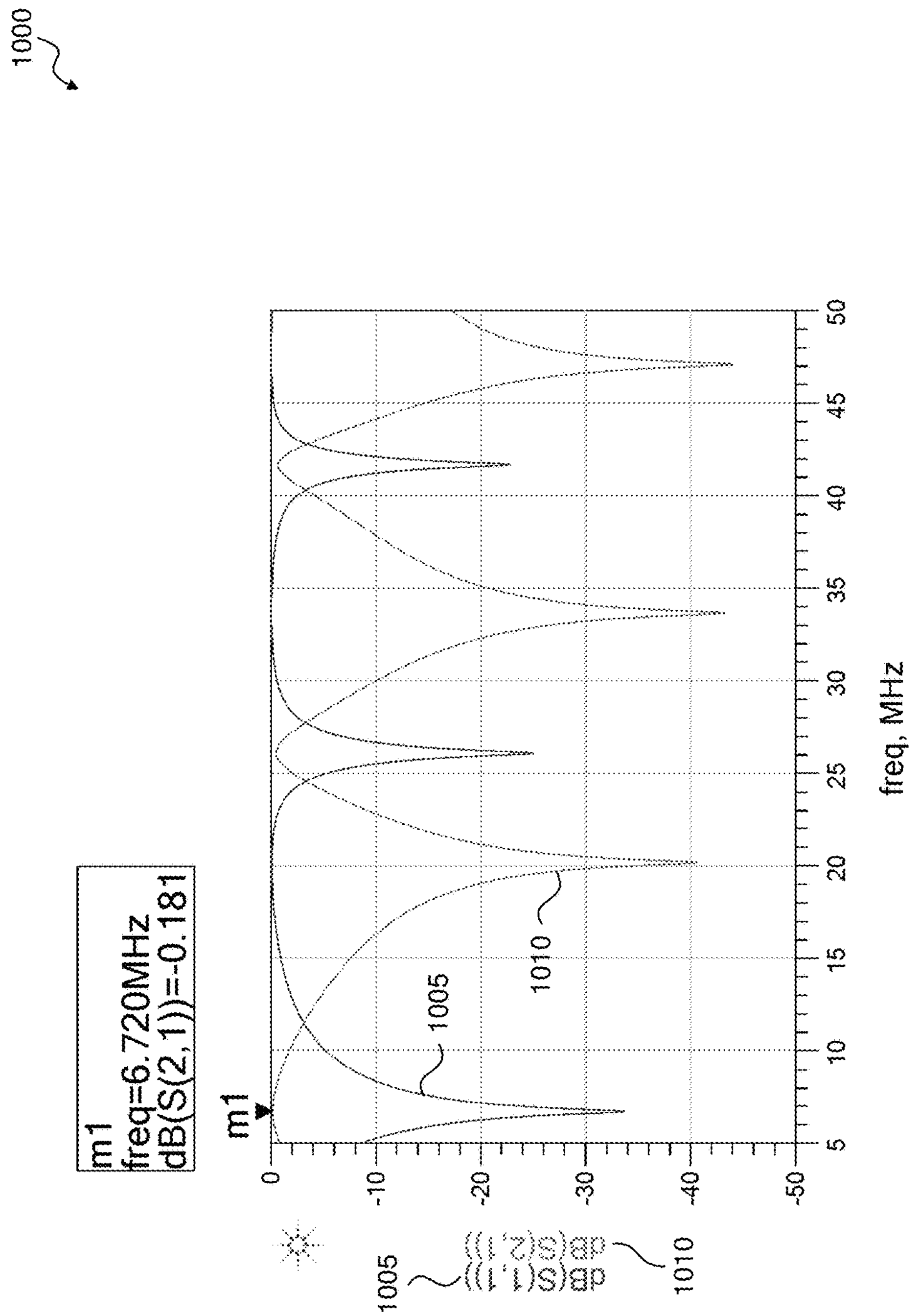
FIG. 10 illustrates the frequency response according to an exemplary aspect of the filter of FIG. 9.

In an exemplary aspect, the capacitor 905 is in series with a LC pair formed of inductor 910 and capacitor 915. The LC pair can be in series with a second LC pair (inductor 920 and capacitor 925) and a third LC pair (inductor 930 and resistor 935). The filter 950 is not limited to this configuration and can include other inductor and capacitor arrangements as would be understood by one of ordinary skill in the relevant arts. FIG. 10 illustrates the frequency response 1005, 1010 of the filter 950.

Figure 11:
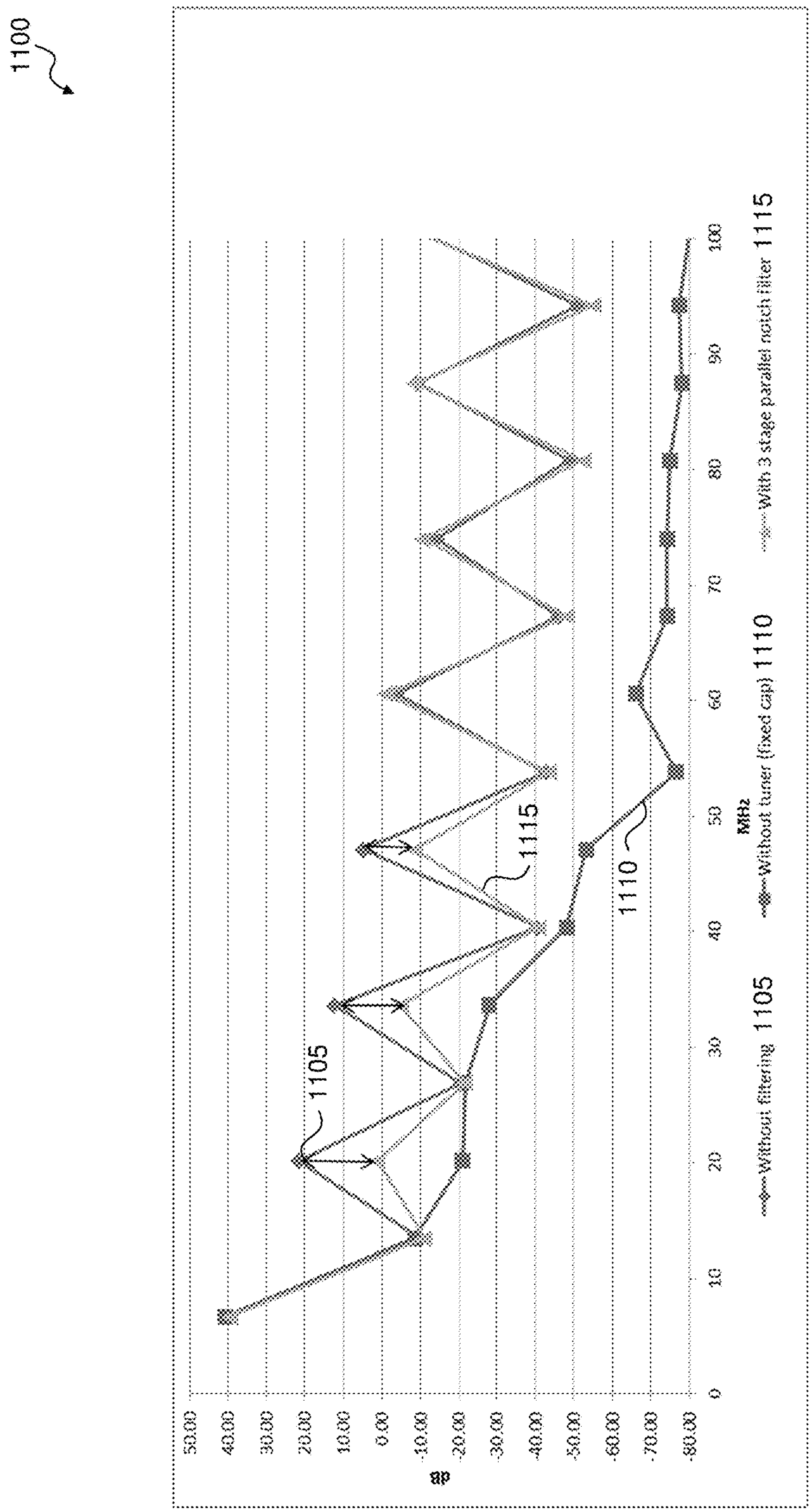
FIG. 11 illustrates a harmonic simulation according to an exemplary aspect of the present disclosure.

FIG. 11 illustrates a harmonics simulation 1100. The line 1110 illustrates the response of a system without a capacitor such as capacitors 305, 705, 805. Line 1105 illustrates a tunable system (having capacitor 305, 705, 805) without a filter such as filters 350, 750, 850. Line 1115 illustrates a tunable system (having capacitor 305, 705, 805) with a filter such as filters 350, 750, 850.

Figure 12:
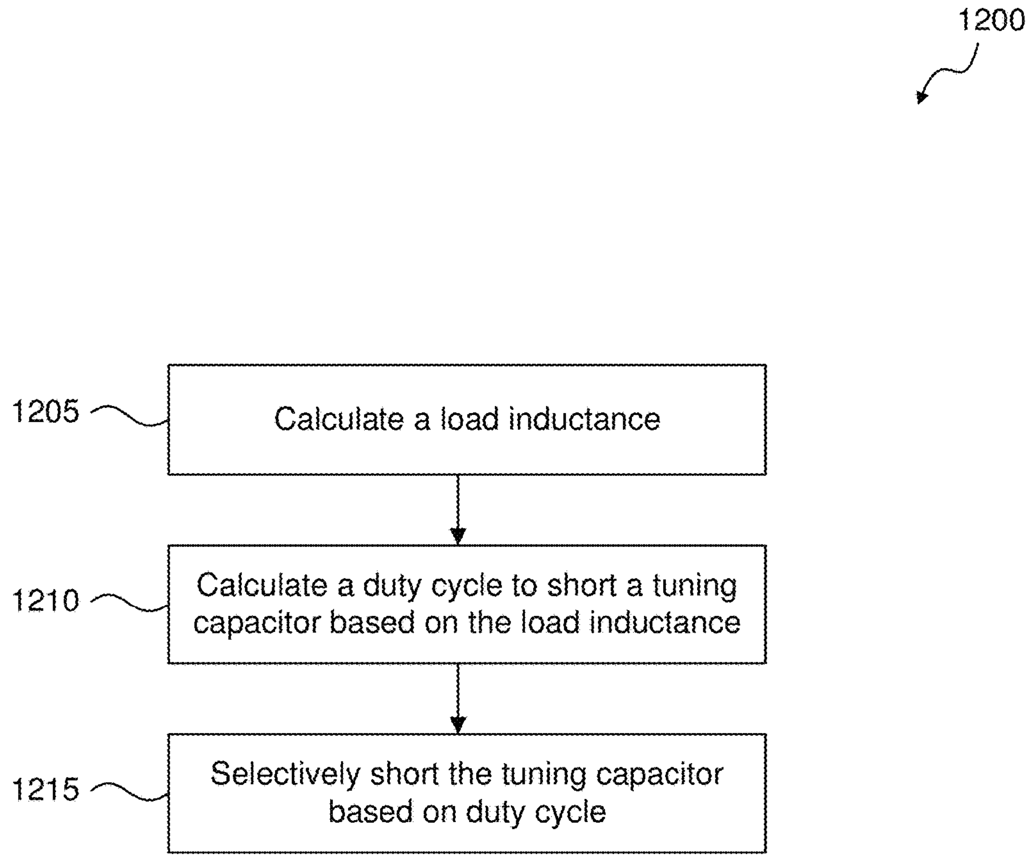
FIG. 12 illustrates a flowchart of a method to tune a wireless power system according to an exemplary aspect of the present disclosure The exemplary aspects of the present disclosure will be described with reference to the accompanying drawings. The drawing in which an element first appears is typically indicated by the leftmost digit(s) in the corresponding reference number.

FIG. 12 illustrates a flowchart of a method 1200 to tune a wireless power system according to an exemplary aspect of the present disclosure. The flowchart is described with continued reference to FIGS. 1-11. The steps of the method are not limited to the order described below, and the various steps may be performed in a different order. Further, two or more steps of the method may be performed simultaneously with each other.

The flowchart 1200 begins at step 1205, where a load inductance of the wireless charging system is calculated. In an exemplary aspect, the controller 220 can calculate the load inductance of, for example, the transmission coil of the system.

After step 1205, the flowchart transitions to step 1210, where a duty cycle is calculated. The duty cycle corresponds to the time in which a capacitor of the system is shorted. The duty cycle can be calculated based on the load inductance. In an exemplary aspect, the controller 220 is configured to calculate the duty cycle based on the load inductance.

After step 1210, the flowchart transitions to step 1215, where the capacitor of the system is selectively shorted based on the duty cycle. In an exemplary aspect, the controller 220 can control a switch to selectively short the capacitor. In an exemplary aspect, the selective shorting of the capacitor is to force a voltage and a current associated with the capacitor to be in phase. The selective shorting of the capacitor can be performed such that a voltage across the capacitor returns to zero when an input voltage supplied driving the wireless charging system reaches its maximum. Further, the tunable capacitance value of the capacitor can be adjusted to tune the wireless charging system into resonance.

EXAMPLES

Example 1 is a wireless charging system, comprising: matching circuitry operatively coupled to a transmission coil having a load inductance, the matching circuitry having a capacitance value; and a controller operatively coupled to the matching circuitry and configured to control the matching circuitry to adjust a voltage associated with the capacitance value based on the load inductance to cause the voltage associated with the capacitance value to be in phase with a current associated with the capacitance value.

In Example 2, the subject matter of Example 1, wherein the matching circuitry comprises a capacitor in parallel with a switch, the voltage associated with the capacitance value being a voltage over the capacitor, wherein the switch is configured to selectively short the capacitor based on a control signal generated by the controller to adjust the voltage across the capacitor.

In Example 3, the subject matter of Example 1, wherein the matching circuitry comprises a capacitor defining the capacitance value, wherein a voltage over the capacitor and the voltage associated with the capacitance value have equivalently operable values.

In Example 4, the subject matter of Example 2, wherein the control signal is generated based on the load inductance.

In Example 5, the subject matter of Example 2, wherein the controller is configured to adjust a duty cycle in which the switch shorts the capacitor based on the load inductance.

In Example 6, the subject matter of Example 5, wherein the controller is configured to control the switch to selectively short the capacitor such that the voltage across the capacitor returns to zero when an input voltage supplied to the matching circuitry reaches its maximum.

In Example 7, the subject matter of Example 2, wherein the capacitor is coupled in series between the transmission coil and a power source providing an input voltage to the matching circuitry.

In Example 8, the subject matter of Example 1, further comprising a filter coupled in series between the transmission coil and the matching circuitry.

In Example 9, the subject matter of Example 1, wherein the controller is configured to control the matching circuitry to adjust the voltage associated with the capacitance value to tune the wireless charging system into resonance.

In Example 10, the subject matter of Example 2, wherein the capacitor is a fixed capacitor.

Example 11 is a wireless charging system, comprising: matching circuitry coupled to a transmission coil having a load inductance, the matching circuitry comprising: a capacitor having a capacitance value; and a switch coupled in parallel to the capacitor and configured to selectively short the capacitor to adjust a voltage across the capacitor; and a controller coupled to the switch of the matching circuitry, the controller being configured to control the switch to selectively short the capacitor to adjust an impedance of the wireless charging system based load inductance.

In Example 12, the subject matter of Example 11, wherein the capacitor is a fixed capacitor and the capacitance value is a fixed capacitance value.

In Example 13, the subject matter of Example 11, wherein the controller is configured to control the switch to selectively short the capacitor based on the load inductance.

In Example 14, the subject matter of Example 11, wherein the controller is configured to control the switch to selectively short the capacitor to force the voltage across the capacitor and a current of the capacitor to be in phase.

In Example 15, the subject matter of Example 11, wherein the controller is configured to adjust a duty cycle in which the switch shorts the capacitor based on the load inductance.

In Example 16, the subject matter of Example 15, wherein the controller is configured to control the switch to selectively short the capacitor such that the voltage across the capacitor returns to zero when an input voltage supplied to the matching circuitry reaches its maximum.

In Example 17, the subject matter of Example 11, wherein the capacitor is coupled in series between the transmission coil and a power source providing an input voltage to the matching circuitry.

In Example 18, the subject matter of Example 11, further comprising a filter coupled in series between the transmission coil and the matching circuitry.

In Example 19, the subject matter of Example 11, wherein the controller is configured to control the switch to selectively short the capacitor to tune the wireless charging system into resonance.

Example 20 is a method to tune a wireless charging system, the method comprising: calculating a load inductance of the wireless charging system; and adjusting a voltage across a capacitor of the wireless charging system based on the load inductance to cause the voltage and a current associated with the capacitor to be in phase.

In Example 21, the subject matter of Example 20, wherein adjusting the voltage comprises selectively shorting the capacitor based on the load inductance.

In Example 22, the subject matter of Example 21, further comprising calculating a duty cycle in which the capacitor is shorted based on the load inductance.

In Example 23, the subject matter of Example 21, wherein the capacitor is selectively shorted such that the voltage across the capacitor returns to zero when an input voltage driving the wireless charging system reaches its maximum.

In Example 24, the subject matter of Example 20, wherein the voltage across the capacitor is adjusted to tune the wireless charging system into resonance.

Example 25 is an apparatus comprising means to perform the method as claimed in any of claims 20-24.

Example 26 is a wireless charging system configured to perform the method as claimed in any of claims 20-24.

Example 27 is a computer program product embodied on a computer-readable medium comprising program instructions, when executed, causes a machine to perform the method of any of claims 20-24.

Example 28 is an apparatus substantially as shown and described.

Example 29 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A wireless charging system, comprising:

matching circuitry operatively coupled to a transmission coil having a load inductance, the matching circuitry including a capacitor having a capacitance value and a switch in parallel with the capacitor; and a controller operatively coupled to the matching circuitry and configured to control the switch of the matching circuitry to selectively short the capacitor to adjust a voltage across the capacitor based on the load inductance to cause the voltage across the capacitor to be in phase with a current of the capacitor.

2. The wireless charging system of claim 1, wherein the switch is configured to selectively short the capacitor based on a control signal generated by the controller to adjust the voltage across the capacitor.

3. The wireless charging system of claim 2, wherein the control signal is generated based on the load inductance.

4. The wireless charging system of claim 1, wherein the controller is configured to adjust a duty cycle in which the switch shorts the capacitor based on the load inductance.

5. The wireless charging system of claim 1, wherein the controller is configured to control the switch to selectively short the capacitor such that the voltage across the capacitor returns to zero when an input voltage supplied to the matching circuitry reaches its maximum.

6. The wireless charging system of claim 1, wherein the capacitor is coupled in series between the transmission coil and a power source providing an input voltage to the matching circuitry.

7. The wireless charging system of claim 1, further comprising a filter coupled in series between the transmission coil and the matching circuitry.

8. The wireless charging system of claim 1, wherein the controller is configured to control the matching circuitry to adjust the voltage associated with the capacitance value to tune the wireless charging system into resonance.

9. The wireless charging system of claim 1, wherein the capacitor is a fixed capacitor.

10. The wireless charging system of claim 1, wherein the controller is further configured to control the switch of the matching circuitry to selectively short the capacitor to maintain a 90° phase shift between the voltage across the capacitor and an input voltage supplied to the matching circuitry.

11. The wireless charging system of claim 1, wherein an input voltage supplied to the matching circuitry reaches its maximum at a first time, the controller being configured to control the switch to close and short the capacitor at the first time.

12. The wireless charging system of claim 11, wherein the controller is configured to control the switch to open at a second time following the first time to phase shift the voltage across the capacitor such that the voltage across the capacitor returns to zero when the input voltage supplied to the matching circuitry reaches its next maximum.

13. A wireless charging system, comprising:

matching circuitry coupled to a transmission coil having a load inductance, the matching circuitry comprising:

a capacitor having a capacitance value; and a switch coupled in parallel to the capacitor and configured to selectively short the capacitor to adjust a voltage across the capacitor; and a controller coupled to the switch of the matching circuitry, the controller being configured to control the switch to selectively short the capacitor to force the voltage across the capacitor to be in phase with a current of the capacitor to adjust an impedance of the wireless charging system based load inductance.

14. The wireless charging system of claim 13, wherein the capacitor is a fixed capacitor and the capacitance value is a fixed capacitance value.

15. The wireless charging system of claim 13, wherein the controller is configured to control the switch to selectively short the capacitor based on the load inductance.

16. The wireless charging system of claim 13, wherein the controller is configured to adjust a duty cycle in which the switch shorts the capacitor based on the load inductance.

17. The wireless charging system of claim 13, wherein the controller is configured to control the switch to selectively short the capacitor such that the voltage across the capacitor returns to zero when an input voltage supplied to the matching circuitry reaches its maximum.

18. The wireless charging system of claim 13, wherein the capacitor is coupled in series between the transmission coil and a power source providing an input voltage to the matching circuitry.

19. The wireless charging system of claim 13, further comprising a filter coupled in series between the transmission coil and the matching circuitry.

20. The wireless charging system of claim 13, wherein the controller is configured to control the switch to selectively short the capacitor to tune the wireless charging system into resonance.

21. A method to tune a wireless charging system, the method comprising:

calculating a load inductance of the wireless charging system; and selectively shorting a capacitor of the wireless charging system based on the load inductance to cause a voltage across the capacitor and a current of the capacitor to be in phase.

22. The method of claim 21, wherein adjusting the voltage comprises selectively shorting the capacitor based on the load inductance.

23. The method of claim 22, further comprising calculating a duty cycle in which the capacitor is shorted based on the load inductance.

24. The method of claim 22, wherein the capacitor is selectively shorted such that the voltage across the capacitor returns to zero when an input voltage driving the wireless charging system reaches its maximum.

25. The method of claim 21, wherein the voltage across the capacitor is adjusted to tune the wireless charging system into resonance.

* * * * *